3,379,735
SULFAMYL ANILINE DERIVATIVES
Karl Sturm and Rolf Geiger, Frankfurt am Main, Walter Siedel, Bad Soden, Taunus, and Franz Starey, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 3, 1963, Ser. No. 327,838
Claims priority, application Germany, Dec. 7, 1962, F 38,487
11 Claims. (Cl. 260—340.5)

The present invention provides sulfamyl compounds which are distinguished by a favourable physiological action and have in particular a blood pressure lowering effect. They, therefore, can be used as agents for lowering the blood pressure. Furthermore, the present invention provides processes for preparing these substances and pharmaceutical preparations having blood pressure lowering action and containing the sulfamyl compounds as the active ingredient.

We have found that hitherto unknown sulfamyl compounds that have a physiological action are obtained by condensing a 3 - sulfamyl - 4-halogeno-trifluoromethyl-benzene of the general Formula I at elevated temperature with an amine of the formula R—NH$_2$ and, if desired, or required, further condensing the reaction product of the Formula II with formaldehyde to produce a 3,4-dihydro-1,2,4-benzothiadiazine-1,2-dioxide of the general Formula III according to the following reaction scheme

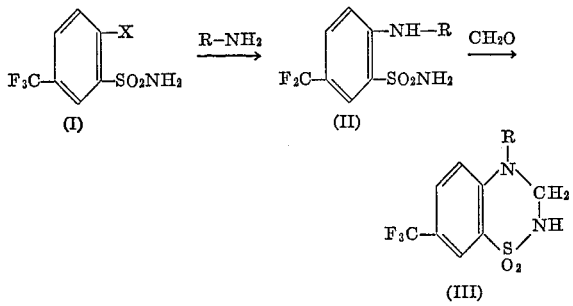

In the above formulae, X represents a halogen atom, preferably chlorine or bromine, and R represents an alkyl, cycloalkyl or cycloalkylalkyl radical having up to 10 carbon atoms, which may be branched or interrupted in the chain by oxygen or sulfur, a hydroxyalkyl radical having up to 5 carbon atoms, an aralkyl radical having 7 to 12 carbon atoms, which may be substituted in the phenyl nucleus by halogen atoms, low molecular alkyl or alkoxy groups or the methylenedioxy radical, the furfuryl or the 2-thenyl radical.

The condensation reaction of the first stage proceeds clearly in the way indicated above, since the trifluoromethyl group is stable to bases. In the first reaction stage, the following amines may be used: methylamine, ethylamine, propylamine, isopropylamine, butylamine, isobutylamine, 2-methyl-pentylamine, n-hexylamine, n-octylamine, cyclopentylamine, cyclohexylamine, cycloheptylamine, cyclohexylmethylamine, 2-methoxyethylamine, 3-methoxypropylamine, 3-ethoxypropylamine, tetrahydrofurfurylamine, 2,2-diethoxyethylamine, 2-methylmercaptoethylamine, 2-propylmercaptoethylamine, 2-hydroxyethylamine, 2-hydroxypropylamine, 3-hydroxypropylamine, benzylamine, 4-chlorobenzylamine, 4-methylbenzylamine, piperonylamine, 1-phenylethylamine, 2-phenylethylamine, 3-phenylpropylamine, furfurylamine and 2-thenylamine.

The exchange of the halogen atom of the benzene compound against the amine radical —NH—R is carried out without catalyst. Optimum reaction temperatures are in the range of 80 and 180° C. If X is bromine, chlorine or iodine, the reaction is preferably carried out at temperatures in the range from 120 to 160° C., and if X is fluorine, preferably at temperatures in the range from 100 and 140° C.

As benzene compound, the easily accessible 3-sulfamyl-4-chlorotrifluoromethylbenzene is used advantageously. When carrying out the condensation with amines which tend to side reactions at elevated temperatures, for example, amino-thio-ethers, benzylamine and the derivatives thereof, furfurylamine and 2-thenylamine, it is of special advantage to effect the reaction at temperatures between 125 and 135° C. during a period of 3 to 8 hours. When using the other amines, the reaction is achieved particularly advantageously at temperatures from 135 to 160° C. during a period of time of 1 to 4 hours.

With amines which boil at a temperature below the reaction temperature, the reaction is carried out at elevated pressure in an autoclave.

According to the reaction equation, two equivalents of amine are required for exchange of the halogen by the amine radical; in practice, however, 3 to 5 equivalents of amine are preferably used in order to increase the speed of the reaction by salt formation at the sulfonamide group, in some cases also for keeping the reaction mixture in the liquid state. When using valuable amines, the reaction may also be carried out with one equivalent of amine with the addition of 1 to 2 equivalents of a mineral base, preferably sodium carbonate or potassium carbonate or sodium hydroxide potassium hydroxide or of an organic tertiary base, for example, triethylamine, tributylamine, dimethylaniline or with pyridine.

When using excess amine R—NH$_2$ or when working with the addition of a tertiary organic base, the reaction may be carried out with or without additional solvent. If, however, a mineral base is used for binding the hydrohalic acid split off, it is necessary to add an organic solvent. Especially suitable as such additives are, for example, low molecular alcohols such as methanol, ethanol, isopropanol, ethylene glycol and diethylene glycol, furthermore hydroxy ethers such as glycol monomethyl ether and glycol monobutyl ether, diethers miscible with water, for example, dioxane and diethylene glycol dimethyl ether and mixtures of these compounds with water.

The condensation product of the general Formula II is isolated by pouring the reaction solution into ice water, adjusting the mixture with glacial acetic acid to a pH value of 4 to 5 and recrystallizing the precipiate (which is crystalline in most cases) in water or aqueous methanol.

The condensation in the second stage with formaldehyde, which may be carried out if desired or required, is preferably and advantageously carried out in a solvent, for example, ethanol, in the presence of a basic catalyst such as sodium carbonate, sodium hydroxide or potassium hydroxide, at temperatures in the range from 50 to 120° C., preferably from 80 to 100° C., during a period of time of 1 to 3 hours. Formaldehyde is expediently added in the form of a 30 to 40% aqueous solution in an excess of 0.2 to 0.5 equivalents.

For isolating the condensation product of the general Formula III, the reaction solution is neutralized, after cooling, by adding dilute acids, concentrated and water is added until crystallization begins.

The 3-sulfamyl-4-halogeno-trifluoromethylbenzenes of the general Formula I used as the starting substances are novel compounds. They are obtained from 2-halogeno-5-trifluoromethylanilines by conversion of the amino group into the sulfochloride group with the aid of Meerwein's diazo reaction [cf. H. Meerwein et al., Chem. Ber., 90, 841 (1957)] and subsequent reaction of the sulfochloride obtained with ammonia.

The products of the general Formulae II and III may be used in their free form or in the form of their salts with physiologically tolerated bases. As mineral bases, there may be mentioned, for example, the hydroxides of alkali metals or alkaline earth metals, and ammonia; as organic bases, there may be used, for example, ethanolamine, ethylenediamine, piperazine, and N-glucosamine.

The products of the present invention have a blood pressure lowering action and exhibit a relatively low toxicity. Thus, for example, 3-sulfamyl-4-benzylamino-trifluoromethylbenzene and 4-benzyl-7-trifluoromethyl-3,4-dihydro-1,2,4-benzothiadiazine-1,1-dioxide, when administered orally in doses from 20 to 50 mg./kg. to dogs with normal blood pressure, produce a lowering of the blood pressure setting in within 1 to 3 hours and lasting up to 6 hours. The doses for therapeutic purposes are in the range from 10 to 100 mg.

The products of the present invention may be administered, parenterally or orally, as such or in the form of their salts, if required or desired, in admixture with the pharmaceutically usual carriers. For oral application, they may be processed as the active substances together with the usual carriers such as lactose, starch, tragacanth and magnesium stearate into, preferably, dragees or tablets. For parenteral application, they are made up into aqueous solutions or suspensions.

The following examples illustrate the invention but they are not intended to limit it thereto:

EXAMPLE 1

3-sulfamyl-4-benzylamino-trifluoromethylbenzene

The mixture of 26 g. of 3-sulfamyl-4-chloro-trifluoromethylbenzene (0.1 mol), 44 cc. of benzylamine (0.4 mol) and 60 cc. of glycol monomethyl ether was heated for 5 hours under reflux. The solution was then poured in 0.4 l. of water and the pH of the solution was adjusted to pH 4.5 by addition of glacial acetic acid. The reaction product which separated in crystalline form was recrystallized from 50% aqueous ethanol with the addition of charcoal and dried. Colorless crystal needles melting at 130° C. were obtained.

3 - sulfamyl - 4-chloro-trifluoromethylbenzene was obtained according to the following method:

196 g. of 3-amino-4-chloro-trifluoromethylbenzene (1 mol) were dropped, with stirring, into 1.0 l. of ice-cold semi-concentrated hydrochloric acid. Into the suspension thus obtained of 3-amino-4-chloro-trifluoromethylbenzene-hydrochloride the solution of 76 g. of sodium nitrite (1.1 mol) in 150 cc. of water was introduced dropwise, while stirring, in the course of 15 minutes at a temperature from 0 to 5° C. After a further reaction period of 5 minutes, the whole was filtered at +5° C. and the filtrate was then introduced dropwise in several portions and as rapidly as possible into an ice-cold mixture of 1.5 l. of glacial acetic acid saturated with sulfur dioxide and an aqueous saturated solution of 50 g. of $CuCl_2 \cdot 2H_2O$. At the end of the evolution of nitrogen, which was very brisk at the beginning, the sulfochloride formed which partially already separated as an oil, was completely separated by the addition of 4 l. of water and then extracted by dissolving it with 2 l. of benzene.

The benzene solution was washed twice with 2 l. of water and, after drying over magnesium sulfate, it was concentrated to 0.3 l. The concentrate was introduced into 1.5 l. of liquid ammonia, excess ammonia was evaporated at room temperature and the residue was dissolved in 0.5 l. of water. The clear solution was then adjusted to a pH value of 5 by means of glacial acetic acid at a temperature in the range from 0 to 5° C. and the sulfonamide which had separated in crystalline form was recrystallized from aqueous ethanol with addition of charcoal. 3-sulfamyl-4-chloro-trifluoromethylbenzene in the form of colorless crystal needles melting at 152° C. was obtained.

EXAMPLE 2

3-sulfamyl-4-ethylamino-trifluoromethylbenzene

The mixture of 26 g. of 3-sulfamyl-4-chloro-trifluoromethylbenzene, 50 cc. of 50% aqueous ethylamine solution and 100 cc. of ethanol was heated in an autoclave under nitrogen having 50 atmospheres gage pressure for 2 hours to 140° C. The yellow reaction solution was then diluted with same volume of water, glacial acetic acid was then added until the reaction solution showed a pH of 5.0 After a short standing at room temperature, it was filtered under reduced pressure and the residue was recrystallized from aqueous ethanol. Colorless flakes melting at 138° C. were obtained.

EXAMPLE 3

3-sulfamyl-4-(2-hydroxyethylamino)-trifluoromethylbenzene 26 g. of 3-sulfamyl-4-chloro-trifluoromethylbenzene and 24 cc. of 2-hydroxyethylamine were heated for 1 hour under reflux in 75 cc. of diethylene glycol dimethyl ether. The mixture was at first homogeneous, but separated later on into two liquid phases. The whole was poured into 0.5 l. of water, was neutralized with 2 N-hydrochloric acid and allowed to stand over night at 0° C. The yellow-brown crude product that had sparated was recrystallized from water with the addition of decolorizing carbon and dried at 40° C. and at a pressure of 15 mm. Hg over potassium hydroxide. Colorless prisms melting at 128 to 130° C. were obtained.

EXAMPLE 4

3-sulfamyl-4(2-phenylethylamino)-trifluoromethylbenzene

The mixture of 26 g. of 3-sulfamyl-4-chloro-trifluoromethylbenzene and 36 g. of 2-phenylethylamine in 80 cc. of diethylene glycol dimethyl ether was heated for 1 hour under reflux and then poured in 1 l. of water. A pH value of 4.0 was adjusted by adding glacial acetic acid. The reaction product which separated in the form of a resin was decanted and washed with water and recrystallized from 60% aqueous ethanol while using charcoal. Colorless leaflets melting at 109° C. were obtained.

EXAMPLE 5

3-sulfamyl-4-(3-methoxypropylamino)-trifluoromethylbenzene 26.0 g. of 3-sulfamyl-4-chloro-trifluoromethylbenzene and 35.6 g. of 3-methoxypropylamine were heated for 3 hours under reflux in 60 cc. of diethylene glycol dimethyl ether. The reaction solution was then poured in 0.4 l. of water, glacial acetic acid was added until a pH value of 4.5 was reached and, after a short standing, the upper layer of liquid was then decanted from the reaction product that had separated in the form of a yellow oil. The crude product was dissolved in 200 cc. of 50% aqueous ethanol, charcoal was added while the solution was still hot and to the filtrate was added water at room temperature until it showed permanent turbidity. The crystal prisms which separated during standing for 2 days at room temperature were washed with a small amount of methanol and dried at the air. The product was found to melt at 68 to 70° C.

EXAMPLE 6

3-sulfamyl-4-piperonylamino-trifluoromethylbenzene

The compound was prepared according to the method described in Example 1 using 46 g. of piperonylamine instead of benzylamine. Colorless crystal leaves melting at 123° C. were obtained.

EXAMPLE 7

3-sulfamyl-4-furfurylamino-trifluoromethylbenzene

The compound was obtained by the method described in Example 1 using 38.8 g. of furfurylamine instead of benzylamine. Weakly yellow crystal needles melting at 113° C. were obtained.

EXAMPLE 8

3-sulfamyl-4-tetrahydrofurfurylamino-trifluoromethylbenzene

The compound was obtained by the method described in Example 1 using 40 g. of tetrahydrofurfurylamine instead of benzylamine and was found to melt at 139° C.

EXAMPLE 9

3-sulfamyl-4-isobutylamino-trifluoromethylbenzene

The mixture of 26 g. of 3-sulfamyl-4-chloro-trifluoromethylbenzene, 29.2 g. of isobutylamine and 200 cc. of ethanol was heated for 2 hours in an autoclave under nitrogen having a gage pressure of 50 atmospheres to 140° C. The yellow reaction solution was then evaporated and the residue was triturated with 0.2 l. of 5 percent acetic acid. The mixture was filtered under reduced pressure and the residue was recrystallized from 50% ethanol while adding charcoal. The product was found to melt at 123° C.

EXAMPLE 10

3-sulfamyl-4-(2-propylmercaptoethylamino)-trifluoromethylbenzene 26.0 g. of 3-sulfamyl-4-chloro-trifluoromethylbenzene and 36 g. of 3-propyl-mercaptoethylamine were heated for 3 hours under reflux in 60 cc. of glycol monomethyl ether. Upon pouring in of the reaction solution in 400 cc. of 5 percent acetic acid, a brown oil separated which slowly solidified at room temperature. The crude product was dissolved in 0.3 l. of boiling 50% aqueous ethanol, was decolorized with carbon while still hot, and water was added at 40° C. to the filtrate until turbidity and the whole was then allowed to stand for 3 days at room temperature. Colorless fine crystal needles melting at 78° C. were obtained.

EXAMPLE 11

4-benzyl-7-trifluoromethyl-3,4-dihydro-1,2,4-benzothiadiazine-1,1-dioxide

The mixture of 6.6 g. of 3-sulfamyl-4-benzylamino-trifluoromethylbenzene (0.02 mol), 3.0 cc. of 30% aqueous formaldehyde solution, 100 cc. of ethanol and 4 cc. of 1 N-NaOH was heated for 2 hours on the water bath. After cooling to room temperature, the whole was neutralized with 1 N-HCl, the solution was concentrated and the reaction product was precipitated by the addition of water. The crystalline crude product was recrystallized from dilute ethanol. Small colorless needles melting at 145° C. were obtained.

EXAMPLES 12 THROUGH 20

According to the method described in Example 11 but using 0.02 mol of the 3-sulfamyl-trifluoromethylbenzene derivatives prepared according to Examples 2 through 10, the following 7-trifluoromethyl-3,4-dihydro-1,2,4-benzothiadiazine-1,1-dioxides correspondingly substituted at the nitrogen atom were obtained:

(12) 4-ethyl-7-trifluoromethyl - 3,4 - dihydro - 1,2,4-benzothiadiazine-1,1-dioxide, recrystallized from 50% ethanol, melting at 161–162° C.

(13) 4-(2-hydroxyethyl)-7-trifluoromethyl - 3,4 - dihydro-1,2,4-benzothiadiazine - 1,1 - dioxide, recrystallized from water, melting at 100–101° C.

(14) 4-(2-phenylethyl) - 7 - trifluoromethyl - 3,4 - dihydro-1,2,4-benzothiadiazine - 1,1 - dioxide, recrystallized from 50% ethanol, melting at 156° C.

(15) 4-(3-methoxypropyl) - 7 - trifluoromethyl - 3,4-dihydro-1,2,4-benzothiadiazine-1,1-dioxide, recrystallized from 50% ethanol, melting at 91° C.

(16) 4-piperonyl - 7 - trifluoromethyl - 3,4 - dihydro-1,2,4-benzothiadiazine - 1,1 - dioxide, recrystallized from 50% ethanol, melting at 129–130° C.

(17) 4-furfuryl-7-trifluoromethyl - 3,4 - dihydro-1,2,4-benzothiadiazine - 1,1 - dioxide, recrystallized from 50% ethanol, melting at 142–143° C.

(18) 4-tetrahydrofurfuryl-7-trifluoromethyl - 3,4 - dihydro-1,2,4-benzothiadiazine - 1,1 - dioxide, recrystallized from 50% ethanol, melting at 115° C.

(19) 4-isobutyl-7-trifluoromethyl - 3,4 - dihydro-1,2,4-benzothiadiazine - 1,1 - dioxide, recrystallized from 50% ethanol, melting at 126–127° C.

(20) 4-(2-propylmercaptoethyl) - 7 - trifluoromethyl-3,4-dihydro-1,2,4-benzothiadiazine-1,1-dioxide, recrystallized from 50% ethanol, melting at 107–108° C.

We claim:

1. The compounds selected from the group consisting of
(a) 2 - sulfamyl - 4 - trifluoromethyl - anilines of the formula

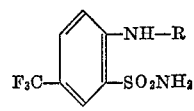

in which R is a member selected from the group consisting of a straight-chain and branched alkyl of 1 to 10 carbon atoms, lower alkoxy-lower alkyl, lower alkyl-mercapto-lower alkyl, cycloalkyl of 5 to 7 carbon atoms, cycloalkylalkyl of 7 carbon atoms, hydroxy-lower alkyl, phenyl-lower alkyl, hydroxyphenyl-lower alkyl, chlorophenyl-lower alkyl, $C_{1-3}$ alkyl-phenyl-lower alkyl, $C_{1-3}$ alkoxy-phenyl-lower alkyl, piperonyl, furfuryl and 2-thenyl, and (b) salts of said compounds with physiologically tolerated bases.

2. 3-sulfamyl-4-benzlamino-trifluoromethyl-benzene.

3. 3-sulfamyl-4-furfurylamino-trifluoromethyl-benzene.

4. 3-sulfamyl-4-ethylamino-trifluoromethylbenzene.

5. 3-sulfamyl - 4 - (2 - hydroxyethylamino)-trifluoromethylbenzene.

6. 3-sulfamyl - 4 - (2 - phenylethylamino)-trifluoromethylbenzene.

7. 3 - sulfamyl-4-(3-methoxypropylamino) - trifluoromethylbenzene.

8. 3 - sulfamyl - 4 - piperonylamino-trifluoromethylbenzene.

9. 3-sulfamyl - 4 - tetrahydrofurfurylamino-trifluoromethylbenzene.

10. 3 - sulfamyl - 4 - isobutylamino-trifluoromethylbenzene.

11. 3 - sulfamyl - 4 - (2 - propylmercaptoethylamino)-trifluoromethylbenzene.

References Cited

UNITED STATES PATENTS

| 3,163,643 | 12/1964 | De Stevens | 260—243 |
| 3,178,424 | 4/1965 | De Stevens | 260—243 |
| 3,125,589 | 3/1964 | Goldkamp | 260—397.7 |
| 3,096,356 | 7/1963 | Jirou | 260—397.7 |
| 3,184,383 | 5/1965 | Hupin | 167—65 |
| 3,139,381 | 6/1964 | Novello | 167—65 |
| 3,163,644 | 12/1964 | De Stevens et al. | 260—243 |
| 3,163,645 | 12/1964 | De Stevens et al. | 260—243 |

NICHOLAS S. RIZZO, *Primary Examiner.*

JULIAN S. LEVITT, *Examiner.*

L. B. RANDALL, *Assistant Examiner.*